(12) United States Patent
Kida et al.

(10) Patent No.: US 9,739,921 B2
(45) Date of Patent: *Aug. 22, 2017

(54) SURFACE LIGHT SOURCE DEVICE AND LIQUID CRYSTAL DISPLAY DEVICE

(71) Applicant: Mitsubishi Electric Corporation, Tokyo (JP)

(72) Inventors: Hiroshi Kida, Tokyo (JP); Akira Daijogo, Tokyo (JP); Saki Maeda, Tokyo (JP); Nami Okimoto, Tokyo (JP); Eiji Niikura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,045

(22) Filed: Sep. 22, 2015

(65) Prior Publication Data

US 2016/0109633 A1 Apr. 21, 2016

(30) Foreign Application Priority Data

Oct. 20, 2014 (JP) .................................. 2014-213628

(51) Int. Cl.
*G02F 1/1335* (2006.01)
*F21V 8/00* (2006.01)

(52) U.S. Cl.
CPC ....... *G02B 6/001* (2013.01); *G02F 1/133603* (2013.01); *G02F 1/133606* (2013.01); *G02F 1/133615* (2013.01); *G02B 6/0006* (2013.01); *G02B 6/0051* (2013.01); *G02B 6/0078* (2013.01); *G02F 2001/133607* (2013.01);
(Continued)

(58) Field of Classification Search
CPC ......... G02F 1/133605; G02F 1/133606; G02F 2001/133607; G02F 1/133611
See application file for complete search history.

(56) References Cited

U.S. PATENT DOCUMENTS

| 7,719,016 B2 | 5/2010 | Nada et al. |
| 2009/0052204 A1* | 2/2009 | Kawashima ......... G02B 6/0078 362/555 |
| 2012/0106127 A1 | 5/2012 | Hattori et al. |

(Continued)

FOREIGN PATENT DOCUMENTS

| JP | 2006-286906 A | 10/2006 |
| JP | 2012-99362 A | 5/2012 |
| JP | 5182909 B2 | 4/2013 |

*Primary Examiner* — Phu Vu
(74) *Attorney, Agent, or Firm* — Birch, Stewart, Kolasch & Birch, LLP

(57) ABSTRACT

A surface light source device includes a first light source for emitting first light, a first light guide rod for causing the first light to be incident thereon and converting the first light into first linear light, a second light source for emitting second light having a greater divergence angle than the first light, and a second light guide rod for converting the second light into second linear light extended in the same direction as the first linear light. Moreover, the surface light source device includes a reflecting bar disposed on an emitting side of the planar light from the first and second light guide rods, and a reflecting portion taking such a box shape as to have an internal wall serving as a reflecting surface, and having an opening portion on a surface at the emitting side of the planar light.

11 Claims, 9 Drawing Sheets

(52) U.S. Cl.
CPC ............ *G02F 2001/133612* (2013.01); *G02F 2001/133613* (2013.01); *G02F 2001/133624* (2013.01)

(56) References Cited

U.S. PATENT DOCUMENTS

| | | | |
|---|---|---|---|
| 2016/0054506 A1* | 2/2016 | Okimoto | G02B 6/0076 349/67 |
| 2016/0054510 A1* | 2/2016 | Okimoto | G02B 6/0055 349/64 |
| 2016/0054517 A1* | 2/2016 | Okimoto | G02B 6/001 349/67 |

* cited by examiner

F I G . 4
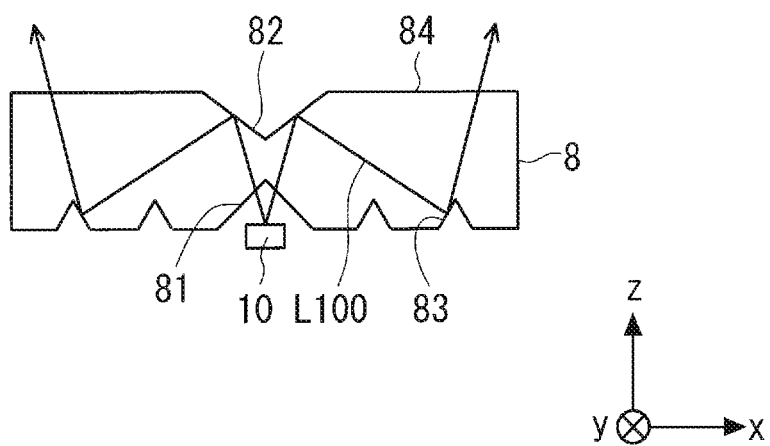

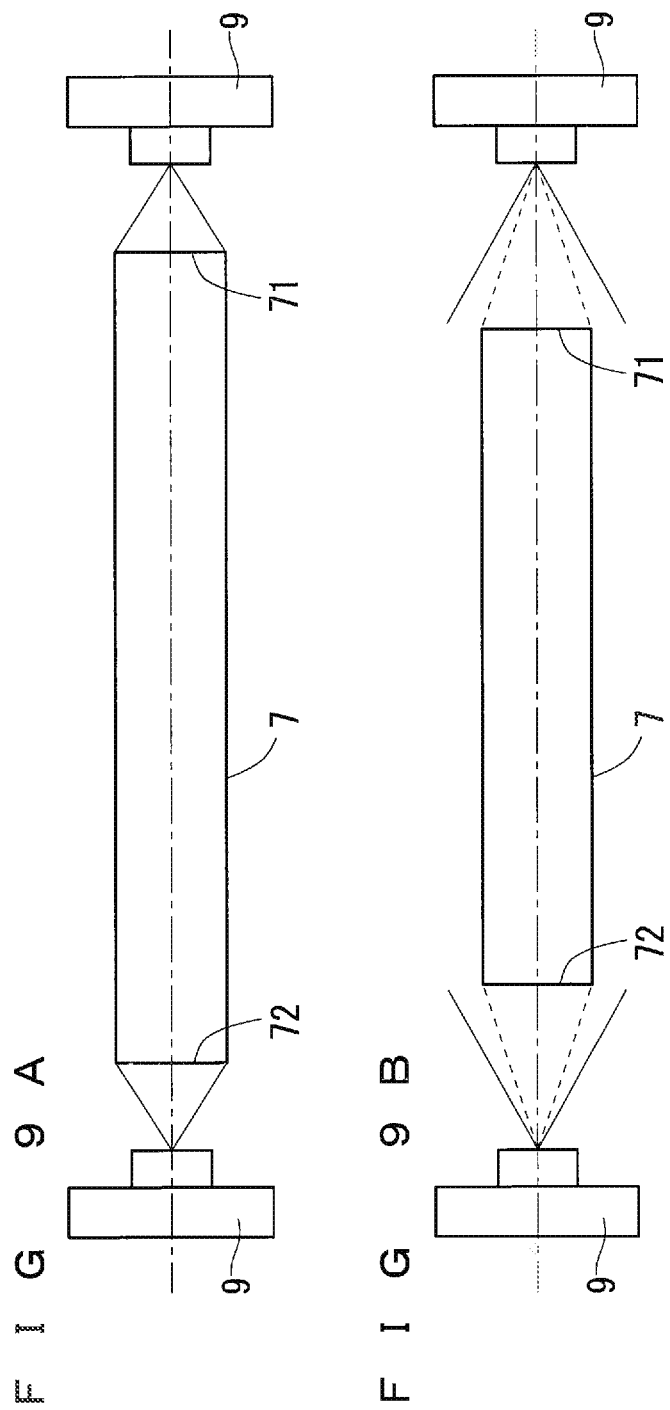

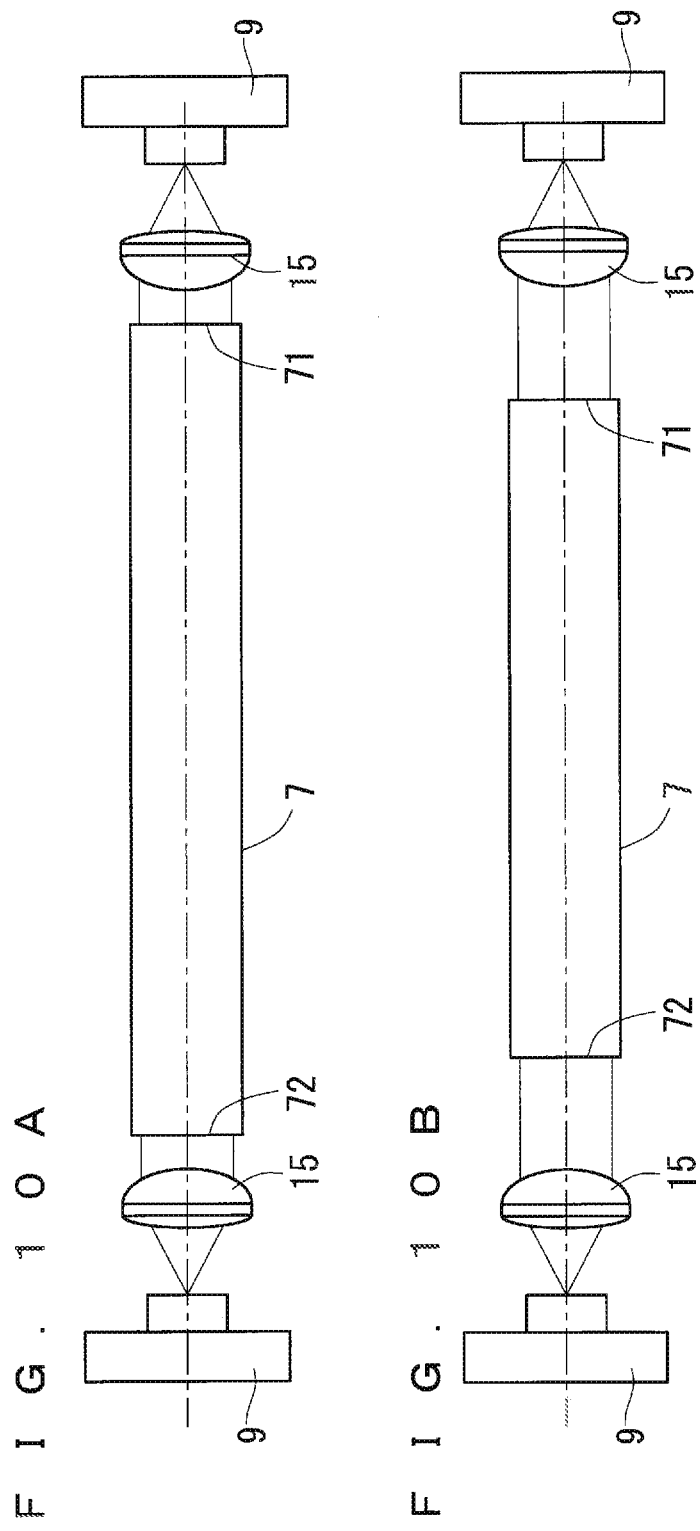

SURFACE LIGHT SOURCE DEVICE AND LIQUID CRYSTAL DISPLAY DEVICE

BACKGROUND OF THE INVENTION

Field of the Invention

The present invention relates to a technique for enhancing in-plane uniformity of a surface light source device.

Description of the Background Art

A liquid crystal display element provided in a liquid crystal display device does not emit light by itself. For this reason, the liquid crystal display device includes a backlight device (a surface light source device) as a light source for illuminating the liquid crystal display element at a back surface side of the liquid crystal display element.

Moreover, the liquid crystal display element includes a color filter and transmits, through a color filter, only light having a part of wavelengths in light emitted from a fluorescent lamp for emitting white light in a continuous spectrum, thereby extracting display colors of red, green and blue to perform color representation. In the case in which only light in a part of wavelength bands is cut out of light source light in the continuous spectrum to obtain the display color, thus, a transmission wavelength band of the color filter provided in the liquid crystal display element should be set to be narrower if color purity of the display color is to be increased in order to enlarge a color reproduction range. For this reason, if the color purity of the display color is to be increased, there is a problem in that a quantity of light transmitted through the color filter is decreased, resulting in reduction in a luminance.

A fluorescent lamp to be generally employed as a light source of a backlight device has a light emission spectrum with a peak in a wavelength shifted to an orange color of approximately 615 nm in a red wavelength range based on a characteristic of a phosphor. If the color purity is to be increased in a wavelength region of 630 to 640 nm which is preferable as pure red in the red color, therefore, there is a problem in that the quantity of transmitted light is extremely reduced, resulting in significant reduction in a luminance. In order to enlarge the color reproduction range while minimizing a light loss caused by the color filter, it is necessary to employ a light source for emitting light having a narrow wavelength bandwidth. In other words, it is necessary to employ a light source for emitting light having high color purity.

As a measure for solving the problems, in recent years, there has been proposed a liquid crystal display device including, as a light source, a monochromatic LED or laser having a narrow wavelength width, that is, high color purity. In particular, the laser has excellent monochromaticity and high light emission efficiency. Therefore, it is possible to obtain a liquid crystal display device having a large color reproduction area, providing an image of high quality with a high luminance, and having low power consumption.

In recent years, the light emission efficiency of the LED has also been enhanced. For this reason, a backlight device for a liquid crystal display element or the like has also used a technique for using three types of LEDs that respectively emit light having red (R), green (G), and blue (B) which are three primary colors of light and mixing colors of RGB light emitted from the three types of LEDs, thereby obtaining white light.

In order to enhance utilization efficiency of light emitted from a light source, furthermore, there has been used a directly under type backlight device for directly supplying light from a back surface to a liquid crystal display element.

In the liquid crystal display device including the backlight device, it is desirable to implement a surface light source device of high quality which has small luminance unevenness and color irregularity with a simple structure.

In this regard, for example, Japanese Patent Application Laid-Open No. 2006-286906 discloses the technology for attaching a light emitting diode device for adjusting light traveling along a central axis of a lens to the lens covering a light emitting diode chip or a periphery thereof, thereby improving luminance unevenness and color irregularity in a liquid crystal display device.

The light emitting diode device described in the Japanese Patent Application Laid-Open No. 2006-286906 is designed for a divergence angle of an LED. By adjusting a direction of light travelling along a central axis of a lens, that is, a direction of light travelling directly toward a display surface, it is possible to obtain white light without unevenness by mixture of LED light having red, green and blue colors.

In the case in which plural types of light sources having greatly different divergence angles are used for a planar light source of a display device, however, a way for travel of light of each light source emitted out of the light emitting diode device is varied due to a difference in light distribution. For this reason, a difference is made in the distribution of light illuminating a display surface for every light source so that luminance unevenness is caused. In particular, a distribution difference on the display surface for different colors causes color irregularity and is thus recognized visually.

As an example, a laser beam has a narrow wavelength bandwidth. By using a laser for the light source, therefore, it is possible to enhance color reproductivity. However, the laser beam has a very small divergence angle. Even if the same optical system as that for LED light is applied, therefore, it is hard to have equivalent expansion to the LED light. When distribution of a laser beam is different from that of the LED light over the display surface, luminance unevenness and color irregularity are caused.

In the case in which the plural types of light sources having different divergence angles are simultaneously used for a surface light source device, thus, it is necessary to match a way for spread of each light source light. Even if the same optical system is applied to each light source light, therefore, it is hard to create a uniform surface light source. If two types of light sources are caused to have structures for creating surface light sources respectively, moreover, the structures are made complicated so that a manufacturing cost is increased.

Also in the case in which a light source of a single type is used for the surface light source device, moreover, it is necessary to enhance in-plane uniformity of the light source light in order to display an image of high quality.

In consideration of the problems, therefore, it is an object of the present invention to display an image of high quality in a display device using a surface light source device having a simple structure.

SUMMARY OF THE INVENTION

A first surface light source device according to the present invention emits planar light. The first surface light source device according to the present invention includes a first light source, a first light guide rod, a second light source, a second light guide rod, a reflecting bar and a reflecting portion. The first light source emits first light. The first light guide rod has an incident surface, causes the first light to be incident from the incident surface, and converts the first light into first linear light. The second light source emits second light having a greater divergence angle than the first light. The second light guide rod has an incident surface, causes the second light to be incident from the incident surface, and converts the second light into second linear light extended in the same direction as the first linear light. The reflecting bar is disposed on an emitting side of the planar light from the first and second light guide rods. The reflecting portion takes such a box shape as to accommodate the first light guide rod, the second light source, the second light guide rod and the reflecting bar and to have an internal wall serving as a reflecting surface for reflecting the first and second linear light, and has an opening portion on a surface at the emitting side of the planar light. The first linear light and the second linear light are reflected by the reflecting bar and the reflecting surface and are emitted from the opening portion to the outside of the reflecting portion.

According to the structure of the first surface light source device in accordance with the present invention, the first linear light and the second linear light are reflected by the reflecting bar and the reflecting surface and are thus mixed with each other, and furthermore, are also mixed with the linear light of the adjacent first and second guide light rods. Therefore, uniform planar light having neither color irregularity nor luminance unevenness can be emitted from the opening portion to the outside of the reflecting portion.

A second surface light source device according to the present invention emits planar light. The second surface light source device according to the present invention includes a light source, a light guide rod, a reflecting bar and a reflecting portion. The light guide rod receives light of the light source and converts the light into linear light. The reflecting bar is disposed on an emitting side of the planar light from the light guide rod. The reflecting portion takes such a box shape as to accommodate the light source, the light guide rod and the reflecting bar and to have an internal wall serving as a reflecting surface for reflecting the linear light, and has an opening portion on a surface at the emitting side of the planar light. The linear light is reflected by the reflecting bar and the reflecting surface and is emitted from the opening portion to an outside of the reflecting portion.

According to the structure of the second surface light source device in accordance with the present invention, the linear light emitted from the light guide rod is reflected and spreads between the reflecting bar and the reflecting surface of the reflecting portion, and is thus mixed with the light emitted from the adjacent light guide rod. Therefore, it is possible to obtain emitted light having excellent in-plane uniformity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing a structure of an LED light guide rod according to the first preferred embodiment;

FIGS. 9A and 9B and FIGS. 10A and 10B are views for explaining an effect of a lens.

DESCRIPTION OF THE PREFERRED EMBODIMENTS

Figure 1:
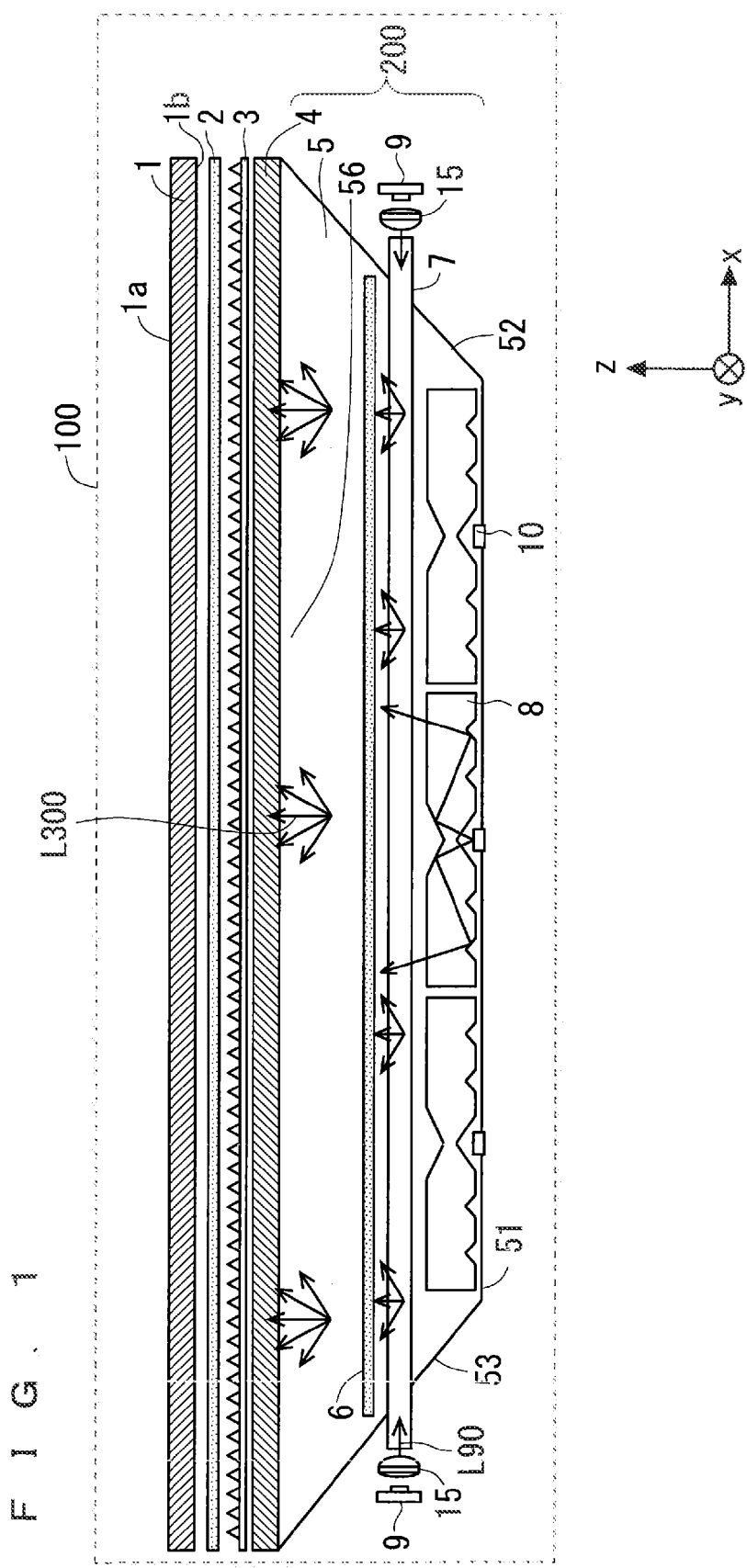
FIG. 1 is a view showing a structure of a liquid crystal display device according to a first preferred embodiment.

A preferred embodiment will be described below with reference to the accompanying drawings. The drawings are schematically shown and a mutual relationship between sizes and positions of images illustrated in different drawings is not always descried correctly but may be changed properly. In the following explanation, moreover, it is assumed that the same components have the same reference numerals and their names and functions are also the same. Accordingly, their detailed description will be omitted in some cases.

First Preferred Embodiment

A-1. Structure

Figure 2:
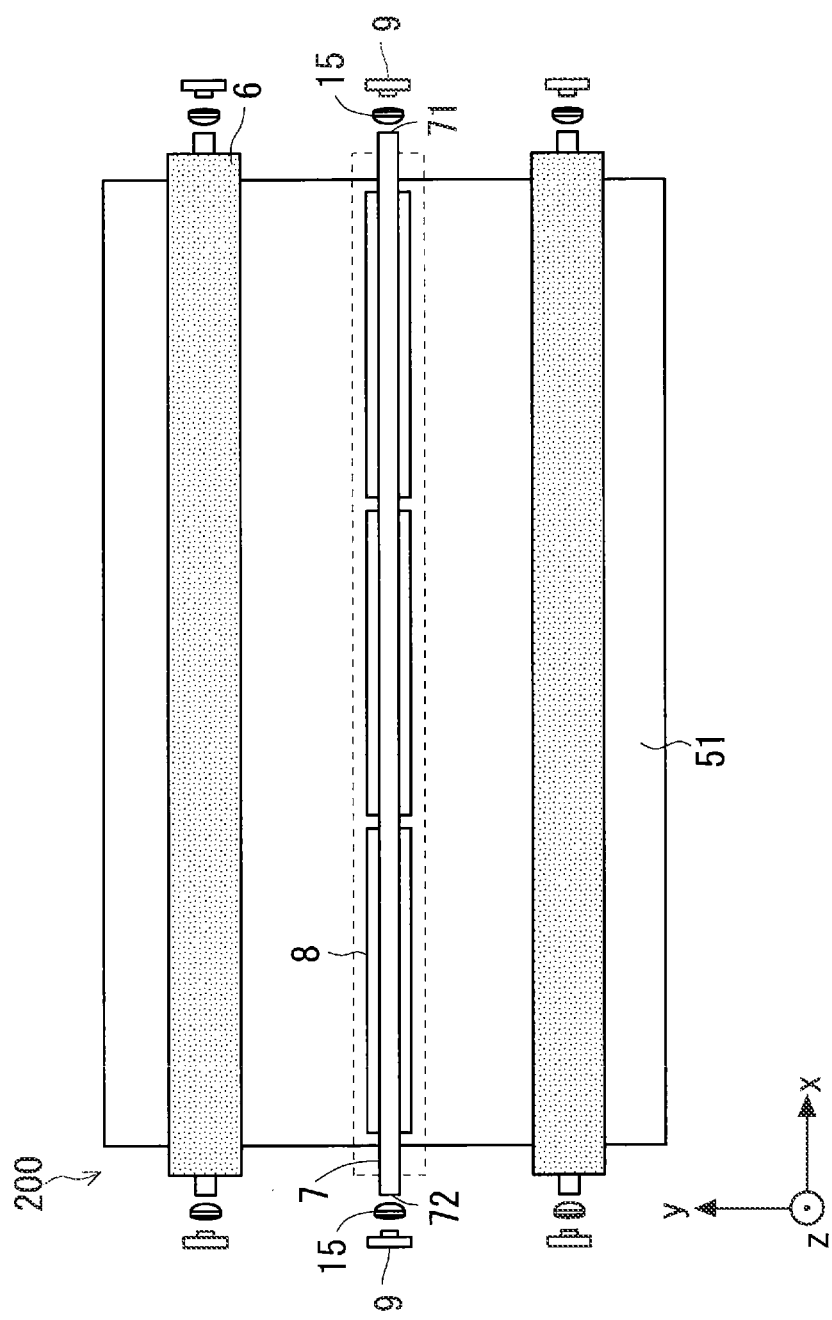
FIG. 2 is a view showing a structure of a surface light source device according to the first preferred embodiment.
Figure 3:
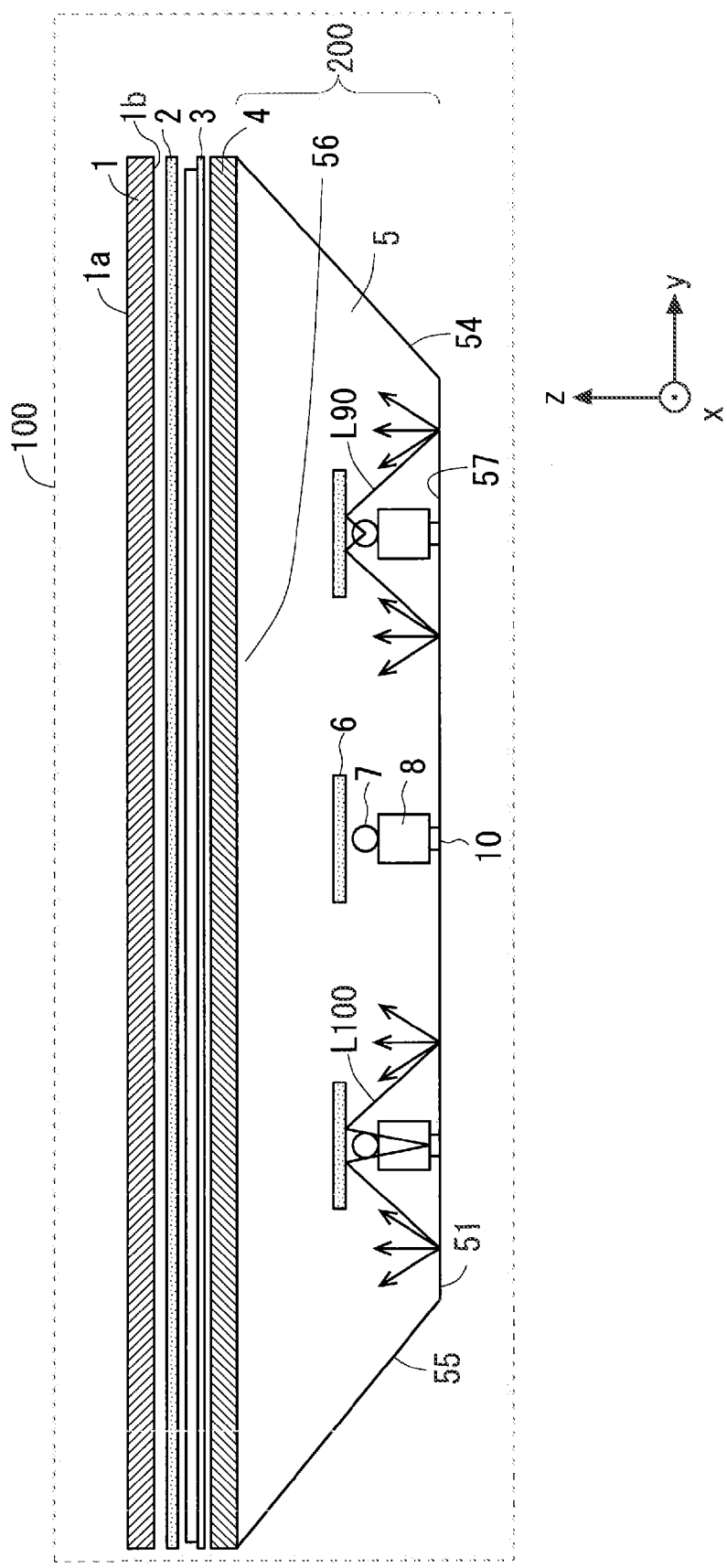
FIG. 3 is a view showing the structure of the liquid crystal display device according to the first preferred embodiment.

FIGS. 1 and 3 show a structure of a liquid crystal display device 100 according to a first preferred embodiment. FIG. 1 is a view showing the liquid crystal display device 100 seen in one direction, and FIG. 3 is a view showing the liquid crystal display device 100 seen in a different direction from the direction in FIG. 1. FIG. 2 shows a structure of a surface light source device 200 to be a component of the liquid crystal display device 100.

As shown in FIG. 1, the liquid crystal display device 100 includes a transmission type liquid crystal panel 1 formed by a liquid crystal display element, optical sheets 2 and 3, and a surface light source device 200.

Figure 5:
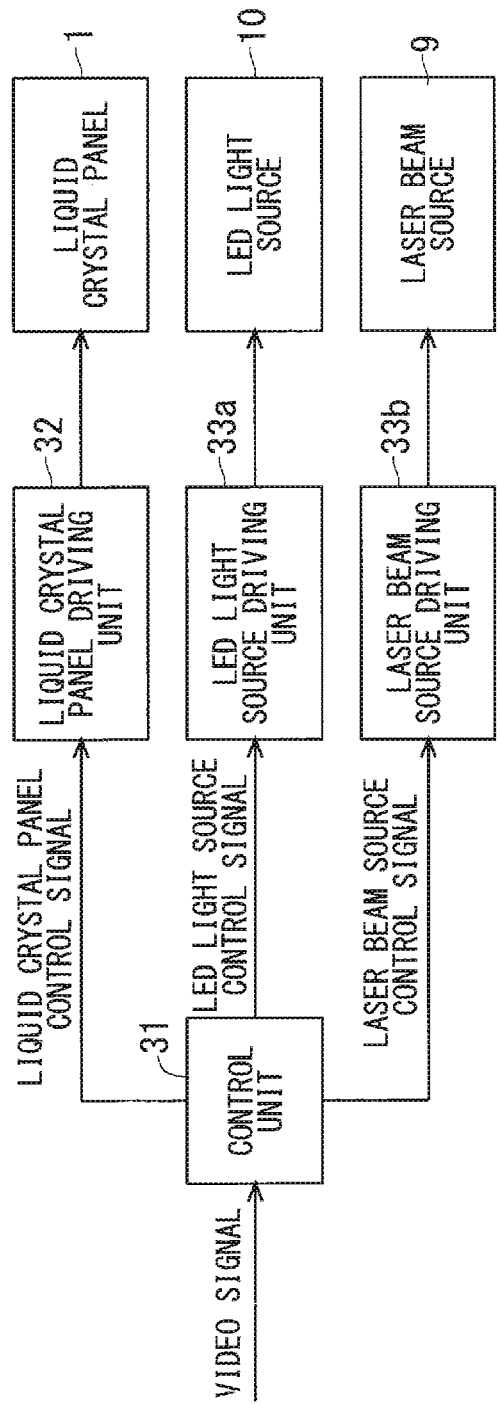
FIG. 5 is a functional block diagram showing the structure of the liquid crystal display device according to the first preferred embodiment.

FIG. 5 is a functional block diagram showing the liquid crystal display device 100. As shown in FIG. 5, the liquid crystal display device 100 further includes a control unit 31, a liquid crystal panel driving unit 32, an LED light source driving unit 33a, and a laser beam source driving unit 33b. These structures will be described in detail.

The surface light source device 200 is disposed on a back surface 1b side of the liquid crystal panel 1 via the optical sheets 2 and 3 and irradiates the back surface 1b with light through the optical sheets 2 and 3. The liquid crystal panel 1 displays an image through illumination of the back surface 1b with light emitted from the surface light source device 200.

The surface light source device 200 includes a thin plate-shaped diffusing plate 4, a reflecting bar 6, a laser beam guide rod 7 (a first light guide rod), an LED light guide rod 8 (a second light guide rod), a laser beam source 9 (a first light source), an LED light source 10 (a second light source), and a reflecting portion 5.

For easy explanation, xyz rectangular coordinate systems are defined in the following manner and coordinate axes of the xyz rectangular coordinate systems are shown in respective drawings. A long side direction of a display surface 1a of the liquid crystal panel 1 is set to be an x-axis direction (a transverse direction in FIG. 1). In FIG. 1, a direction turned from a side portion 53 of the reflecting portion 5 toward a side portion 52 on an opposite side (a direction from left toward right in the paper) is set to be a positive direction of an x axis (a +x-axis direction), and an opposite direction thereto is set to be a negative direction of the x axis (a −x-axis direction). Moreover, a short side direction of the display surface 1a of the liquid crystal panel 1 is set to be a y-axis direction (a perpendicular direction to the paper in FIG. 1). In FIG. 1, a direction from the front side toward the back side of the paper of FIG. 1 is set to be a positive direction of a y axis (a +y-axis direction) and an opposite direction thereto is set to be a negative direction of the y axis (a −y-axis direction). Moreover, a perpendicular direction to an x-y plane including the x axis and the y axis is set to be a z-axis direction (a vertical direction in FIG. 1). In FIG. 1, a direction from the diffusing plate 4 toward the liquid crystal panel 1 (an upward direction in the paper) is set to be a positive direction of the z axis (a +z-axis direction) and an opposite direction thereto is set to be a negative direction of the z axis (a −z-axis direction).

As shown in FIG. 1, in the liquid crystal display device 100, the liquid crystal panel 1, the optical sheet 2, the optical sheet 3 and the surface light source device 200 are disposed in order toward the negative direction of the z axis. The optical sheet 3 has a function for directing illumination light L300 of the surface light source device 200 transmitted through the diffusing plate 4 toward the back surface 1b of the liquid crystal panel 1. The optical sheet 2 has a function for suppressing an optical influence such as fine illumination unevenness of the illumination light L300.

The liquid crystal panel 1 includes the display surface 1a, the back surface 1b, and a liquid crystal layer (not shown). The display surface 1a is provided on an end face at the +z-axis side of the liquid crystal panel 1, and the back surface 1b is provided on an end face at the −z-axis side of the liquid crystal panel 1. The liquid crystal layer is provided between the display surface 1a and the back surface 1b in the liquid crystal panel 1.

The display surface 1a of the liquid crystal panel 1 is parallel with an x-y plane. A liquid crystal layer of the liquid crystal panel 1 has a planar structure which is parallel with the x-y plane. The display surface 1a generally takes a rectangular shape and two adjacent sides thereof (a long side in the x-axis direction and a short side in the y-axis direction) are orthogonal to each other. Although description will be given on the assumption that the display surface 1a of the liquid crystal panel 1 takes the rectangular shape in the present preferred embodiment, the shape of the display surface 1a of the liquid crystal panel 1 is not restricted thereto but other shapes may be taken.

As shown in FIGS. 1 and 3, the reflecting portion 5 is formed in such a box shape as to accommodate the laser beam guide rod 7, the LED light source 10, the LED light guide rod 8 and the reflecting bar 6. Specifically, the reflecting portion 5 includes a back portion 51 which is parallel with the x-y plane, four side portions 52, 53, 54 and 55, and an opening portion 56. FIG. 3 is a schematic view showing the liquid crystal display device 100 of FIG. 1 as seen from the +x-axis direction side.

The side portion 52 is disposed on an end in the +x-axis direction of the back portion 51 and the side portion 53 is disposed on an end in the −x-axis direction of the back portion 51. The side portion 54 is disposed on an end in the +y-axis direction of the back portion 51 and the side portion 55 is disposed on an end in the −y-axis direction of the back portion 51. Main surfaces of the back portion 51 (inner and outer surfaces) are smaller planes than the display surface 1a of the liquid crystal panel 1. For this reason, the four side portions 52, 53, 54 and 55 are gradually tilted inward toward the back portion 51. The opening portion 56 is provided on a surface at the emitting side of the reflecting portion 5 in a normal direction of the back portion 51.

An inner surface of the reflecting portion 5 is a reflecting surface (not shown), and the reflecting surface has a function for reflecting and diffusing light. Herein, the inner surface of the reflecting portion 5 is an inner surface of the box shape of the reflecting portion 5, that is, an internal wall. In other words, the reflecting surface of the reflecting portion 5 indicates a surface in the +z-axis direction of the back portion 51, a surface in the −x-axis direction of the side portion 52, a surface in the +x-axis direction of the side portion 53, a surface in the −y-axis direction of the side portion 54 and a surface in the +y-axis direction of the side portion 55. The reflecting surface can be configured by disposing a light reflection sheet using a resin such as polyethylene terephthalate as a base material on the whole inner surface of the reflecting portion 5, for example. Moreover, the reflecting surface may be configured by depositing a metal onto the whole inner surface of the reflecting portion 5.

The diffusing plate 4 is disposed on the +z-axis direction side of the reflecting portion 5. The diffusing plate 4 is disposed to cover the opening portion 56 in the +z-axis direction of the opening portion 56. Although the reflecting portion 5 takes the box shape as described above, it can also be said that a hollow box shape having a diffusing surface (a surface in the −z-axis direction of the diffusing plate 4) and a reflecting surface is configured from the reflecting portion 5 and the diffusing plate 4.

The laser beam guide rod 7 is disposed in penetration through an inner part of the hollow box shape in the x-axis direction. Herein, the x-axis direction is assumed to include both the +x-axis direction and the −x-axis direction, and the y-axis direction and the z-axis direction are also the same. The LED light guide rod 8 is disposed on the −z-axis direction side from the laser beam guide rod 7 in the reflecting portion 5. The LED light source 10 is disposed on the surface (the reflecting surface) in the +z-axis direction of the back portion 51. Moreover, the reflecting bar 6 is disposed on the +z-axis direction side from the laser beam guide rod 7 in the reflecting portion 5. In other words, the surface light source device 200 has such a structure as to include the reflecting bar 6, the laser beam guide rod 7, the LED light guide rod 8 and the LED light source 10 in order from the positive direction of the z axis toward the negative direction thereof in the hollow box shape formed by the reflecting portion 5 and the diffusing plate 4.

As shown in FIGS. 1 to 3, the LED light source 10, the LED light guide rod 8, the laser beam guide rod 7, and the reflecting bar 6 are disposed in the z-axis direction. Furthermore, sets of the LED light source 10, the LED light guide rod 8, the laser beam guide rod 7, and the reflecting bar 6 disposed in the z-axis direction are provided in plural numbers in the y-axis direction.

The laser beam guide rod 7 is disposed in penetration through the side portions 52 and 53 of the reflecting portion 5. In other words, the laser beam guide rod 7 is held on the reflecting portion 5 with ends thereof protruded to the outside of the reflecting portion 5. Specifically, the side portions 52 and 53 are provided with holes each having a size equal to or larger than the end face in the x-axis direction of the laser beam guide rod 7 in a position where the y-z plane coordinates of the side portions 52 and 53 are common, and the laser beam guide rod 7 is inserted through the hole and is thus attached to the reflecting portion 5. Accordingly, an incident surface 71 of the laser beam guide rod 7 is disposed on the +x-axis direction side from the side portion 52, and an incident surface 72 is disposed on the −x-axis direction side from the side portion 53. In other words, the incident surfaces 71 and 72 are disposed on the outside of the reflecting portion 5.

The laser beam sources 9 are disposed in opposed positions to the incident surfaces 71 and 72, and one of them is present in the +x-axis direction from the side portion 52 and the other is present in the −x-axis direction from the side portion 53. In other words, the laser beam sources 9 are disposed on the outside of the reflecting portion 5. The laser beam source 9 includes a light emitting unit (not shown). The laser beam source 9 opposed to the incident surface 71 is disposed with the light emitting unit turned toward the −x-axis direction and emits a laser beam in the −x-axis direction. Moreover, the laser beam source 9 opposed to the incident surface 72 is disposed with the light emitting unit turned toward the +x-axis direction and emits a laser beam in the +x-axis direction.

A lens 15 is disposed between the incident surface 71 of the laser beam guide rod 7 and the laser beam source 9 opposed thereto and a lens 15 is disposed between the incident surface 72 and the laser beam source 9 opposed thereto. In other words, the laser beam sources 9, the lenses 15 and the laser beam guide rod 7 are disposed on a straight line along the x-axis direction.

A-2. Light Source

A white LED outputs white light having a wide spectrum from a blue color to a red color. Moreover, the white LED has high light emission efficiency and is effective for reducing power consumption. In recent years, therefore, the white LED is employed as light sources of backlight units in many liquid crystal display devices.

A liquid crystal display element of the liquid crystal display device takes out light having respective wavelengths for red, green and blue colors from white light, thereby performing color representation by means of a color filter. In the case of use of a light source having a continuous spectrum with a wide wavelength bandwidth like the white LED, it is necessary to set a narrow wavelength band of light transmitted through the color filter, thereby enhancing color purity of a display color in order to enlarge a color reproducing range. When the wavelength band of the light transmitted through the color filter is set to be narrow, however, a quantity of unnecessary light is increased so that utilization efficiency of light in the liquid crystal display element is reduced. This causes reduction in a luminance of the display surface of the liquid crystal display element, and furthermore, causes increase in the power consumption of the liquid crystal display device.

In general, a person has a high sensitivity to a color difference of the red color. For this reason, a person feels a difference in a wavelength bandwidth of the red color as a more remarkable difference than a difference in the wavelength bandwidth of other colors. Herein, "a difference in a wavelength bandwidth" indicates a difference in color purity. The white LED to be used as the light source in the conventional liquid crystal display device particularly has a small energy quantity of a red spectrum in a band of 600 nm to 700 nm. For this reason, when a color filter having a narrow wavelength bandwidth is used in order to enhance the color purity of a wavelength region of 630 nm to 640 nm which is preferable as pure red in the red color, a quantity of transmitted light is decreased so that the utilization efficiency of the light is reduced, resulting in a poorer luminance.

On the other hand, according to the laser beam emitting element having a narrower wavelength bandwidth than the white LED, it is possible to obtain light having high color purity. Moreover, it is possible to prevent a loss of a light quantity from being caused by the color filter, resulting in increase in the utilization efficiency of the light.

In the surface light source device 200, therefore, red light in three primary colors of light is particularly emitted by using the laser beam source 9 configured from a laser beam emitting element and having a high monochromatism. Consequently, a more remarkable effect is produced for reduction in power consumption and enhancement in color purity as compared with the case in which light having the other colors are emitted by the laser beam source.

Moreover, a blue-green LED element is employed for the LED light source 10. The blue-green LED element has a structure in which a package including a monochromatic LED element for emitting blue light is filled with a green phosphor for absorbing blue light and emitting green light, and emits blue-green light. The LED light source 10 which is configured from the blue-green LED element and can be applied to a display and is of a simple small type has smaller power consumption and higher power as compared with a monochromatic LED light source for emitting green light or a laser beam source for emitting green light.

By using the LED light source 10 configured from the blue-green LED element and the laser beam source 9 configured from the red laser beam emitting element together, therefore, it is possible to implement a liquid crystal display device having both a wider color reproducing range and a lower power consuming property than those in the related art. The LED light source 10 is not restricted to the blue-green LED element but may include both a blue LED element for emitting blue light and a green LED element, for example. In this case, however, a power saving effect is poorer as compared with the case in which the blue-green LED element is employed for the LED light source 10.

The wavelength bandwidth of the red light in the white LED light is wider than that of a red laser beam. A spectrum of light transmitted through a green filter is adjacent to that of the red light. For this reason, in the conventional liquid crystal display device using the white LED for a light source, a part of the red light is transmitted through the green filter so that the color purity of the green color is reduced. On the other hand, the surface light source device 200 uses the laser beam source 9 configured from a red laser beam emitting element so that the color purity of the red color can be enhanced. Since the light quantity of the red color transmitted through the green filter is reduced, moreover, the color purity of the green color can also be enhanced.

Although the blue-green LED element is used for the LED light source 10 and the red laser beam emitting element is used for the laser beam source 9 as described above, the structure according to the present invention is not restricted thereto. For example, the blue LED element and the green LED element may be used for the LED light source 10. However, a power saving effect is poorer as compared with case in which the blue-green LED element is used. Moreover, the green LED element may be used for the LED light source 10 and the red laser beam emitting element and the blue laser beam emitting element may be used for the laser beam source 9. In this case, for example, the red laser beam emitting element and the blue laser beam emitting element are alternately disposed in the y-axis direction. For example, furthermore, the red LED element and the green LED element can be used for the LED light source 10 and the blue laser beam emitting element can be used for the laser beam source 9. In this case, for example, the red LED element and the green LED element are disposed alternately in the y-axis direction. However, it is possible to produce advantages, for example, reduction in power consumption and enhancement in color purity by using the red laser beam emitting element for the laser beam source 9 as compared with the case in which the blue laser beam emitting element is used.

A-3. Light Guide Rod

As shown in FIGS. 2 and 3, the laser beam guide rods 7 are disposed at a predetermined interval in the y-axis direction with the x-axis direction set to be a longitudinal direction thereof. Both end faces in the longitudinal direction in each of the laser beam guide rods 7 have the +x-axis side set to be the incident surface 71 (the first incident surface) and the −x-axis side set to be the incident surface 72 (the second incident surface). The laser beam source 9 (more specifically, a light emitting unit of the laser beam source 9) is disposed in each of opposed positions to the incident surfaces 71 and 72 with a lens 15 interposed therebetween, respectively. A laser beam L90 (first light) emitted from the laser beam source 9 is incident on the inner part of the laser beam guide rod 7 from the incident surfaces 71 and 72.

The laser beam L90 is totally reflected on an interface between the laser beam guide rod 7 and an air layer, and at the same time, is propagated in a direction of an incident surface at an opposite side to the incident surface for incidence. In other words, in FIG. 1, the laser beam L90 incident from the incident surface 72 on the −x-axis side of the laser beam guide rod 7 travels in the +x-axis direction in the inner part of the laser beam guide rod 7. Moreover, the laser beam L90 incident from the incident surface 71 on the +x-axis side of the laser beam guide rod 7 travels in the −x-axis direction in the inner part of the laser beam guide rod 7.

The laser beam guide rod 7 is constituted by a transparent material and a substance (a diffusing material) having a higher refractive index than the transparent material, for example. Moreover, the laser beam guide rod 7 is a cylindrical member having a diameter of approximately 3 mm, for example. The laser beam L90 is totally reflected on the interface between the laser beam guide rod 7 and the air layer, and at the same time, is propagated in the inner part of the laser beam guide rod 7. When the laser beam L90 is incident on the diffusing material, however, it is diffused and reflected and thus changes a travelling direction. Any of the laser beams L90 having the travelling directions changed do not satisfy a full reflecting condition on the interface between the surface of the laser beam guide rod 7 and the air layer, and they are emitted from the laser beam guide rod 7 in various directions.

In the laser beam guide rod 7, a concentration of the diffusing material contained in the transparent material is adjusted to obtain uniform intensity distribution in the x-axis direction with the laser beam L90 emitted from the laser beam guide rod 7 serving as linear light. Herein, an acrylic resin (polymethyl methacrylate: PMMA) or the like is employed for the transparent material, for example. The laser beam L90 is converted into linear light (first linear light) extended in the x-axis direction by the laser beam guide rod 7.

The laser beam L90 incident on the laser beam guide rod 7 from the incident surfaces 71 and 72 and emitted in the +z-axis direction is reflected by the reflecting bar 6 in the −z-axis direction. The laser beam L90 travelling in the −z-axis direction reaches the back portion 51 of the reflecting portion 5 and is diffused and reflected by the reflecting surface and thus spreads in the y-axis direction. By the spread in the y-axis direction, the laser beam L90 spatially overlaps with the laser beam L90 emitted from the adjacent laser beam guide rod 7. When the laser beam L90 emitted in such a direction as not to reach the reflecting bar 6 reaches the back portion 51 or the side portions 52, 53, 54 and 55 with spread to the inner part of the reflecting portion 5, moreover, it is diffused and reflected by the reflecting surface.

As described above, the laser beam L90 is changed into linear light extended in the longitudinal direction (the x-axis direction) of the laser beam guide rod 7 by means of the laser beam guide rod 7. Then, the linear light spreads in an array direction (the y-axis direction) of the laser beam guide rod 7 by the reflecting bar 6 and overlaps with the linear light emitted from the adjacent laser beam guide rod 7, and is changed into planar light for illuminating the back surface 1b of the liquid crystal panel 1.

As the laser beam source 9, for example, a semiconductor laser is employed. The semiconductor laser includes a fast axis direction having a great divergence angle and a slow axis direction having a small divergence angle based on a structure thereof. The slow axis direction is orthogonal to the fast axis direction. In other words, light spreading greatly in one direction is emitted from a light emitting point of the laser beam source 9.

The lens 15 collects laser beams emitted from the laser beam source 9 and changes them into parallel light. The lens 15 is disposed between the incident surfaces 71 and 72 of the laser beam guide rod 7 and the laser beam source 9 in such a manner that the light emitting point of the laser beam source 9 is positioned in the vicinity of a focal length of the lens 15.

The effect of the lens 15 will be described with reference to FIGS. 9A and 9B and FIGS. 10A and 10B. FIGS. 9A and 9B show, as a comparative example, a situation in which the laser beam L90 is incident on the laser beam guide rod 7 without using the lens 15. In order to cause the spreading light emitted from the laser beam source 9 to be incident on the laser beam guide rod 7 efficiently, it is necessary to dispose the incident surfaces 71 and 72 of the laser beam guide rod 7 close to the laser beam source 9. However, there is a tendency that the laser beam guide rod 7 expands with a rise in temperature and contracts with a drop in the temperature. For this reason, the interval between the laser beam guide rod 7 and the laser beam source 9 is varied depending on the temperature. In the case in which a plastic material is used as a material of the laser beam guide rod 7, particularly, a length is changed greatly depending on humidity in addition to the temperature. In other words, when the humidity is increased, there is a tendency of expansion. It is necessary to design the length of the laser beam guide rod 7 in such a manner that the laser beam guide rod 7 does not interfere with the opposed laser beam source 9 in consideration of an arrangement interval from the laser beam source 9 and expansion caused by the temperature and the humidity (FIG. 9A). When the laser beam guide rod 7 contracts at low temperature, however, the incident surfaces 71 and 72 go away from the laser beam source 9 and any component cannot be taken into the incident surface, resulting in a loss (FIG. 9B).

FIGS. 10A and 10B show a situation in which the lens 15 is used to cause the laser beam L90 to be incident on the laser beam guide rod 7. FIG. 10A shows a normal state and FIG. 10B shows a state in which the laser beam guide rod 7 contracts. The laser beam L90 is changed into parallel light by the lens 15. Even if the positions of the incident surfaces 71 and 72 in the laser beam guide rod 7 are varied, therefore, it is possible to cause the laser beam L90 to be incident on the beam guide rod without a loss. In other words, even if the length of the laser beam guide rod 7 is changed depending on the temperature and the humidity, the laser beam L90 having an intensity which is always constant can be incident on the laser beam guide rod 7. The light emitting point of the laser beam source 9 is positioned in the vicinity of the focal length of the lens 15 so that the light transmitted out of the lens 15 is made parallel. In consideration of a tolerance, however, it is desirable that the light transmitted out of the lens 15 should not have a divergence tendency but a convergence tendency. For this reason, it is desirable that the light emitting point of the laser beam source 9 should be positioned far from the focal position of the lens 15.

Next, the LED light guide rod 8 will be described with reference to FIGS. 1, 3 and 4. FIG. 4 is a schematic view schematically showing a structure of the LED light guide rod 8. The LED light guide rod 8 is made of a transparent material such as an acrylic resin (PMMA) and a substance (a diffusing material) having a higher refractive index than that of the transparent material, for example. Moreover, the LED light guide rod 8 includes an incident surface 81 (a third incident surface), a reflecting surface 82, a microstructure 83, and an emitting surface 84 on a prismatic bar of approximately 5 mm square, for example.

The LED light guide rod 8 is disposed on the −z-axis side of the laser beam guide rod 7 close to the laser beam guide rod 7. More specifically, the LED light guide rod 8 is disposed to be turned in the x-axis direction and arranged in a plurality of lines at a predetermined interval in the y-axis direction. Moreover, three LED light guide rods 8 are disposed at a predetermined interval in the x-axis direction with respect to the laser beam guide rods 7, respectively.

FIG. 3 shows a situation in which the LED light guide rod 8 is disposed in overlap with the laser beam guide rod 7 as seen on a plane from the emitting side of the reflecting portion 5, that is, the emitting side of planar light. However, both of them do not always need to overlap with each other but may be arranged in parallel. In that case, however, light transmitted from the laser beam guide rod 7 and the LED light guide rod 8 are reflected by the same surface of the reflecting bar 6 to mix colors. For this reason, the width of the reflecting bar 6 should be increased corresponding to increase in the interval between the laser beam guide rod 7 and the LED light guide rod 8. When the width of the reflecting bar 6 is increased, it is hard to distribute the LED light or the laser beam onto the upper surface of the reflecting bar 6 (the opening portion 56 side). Therefore, there is a fear that the same portion might be projected in shadow, resulting in luminance unevenness. In order to prevent this, it is necessary to install the laser beam guide rod 7 and the LED light guide rod 8 as close as possible. Also in the case in which they are arranged in parallel, it is desirable that the interval should be equal to or smaller than 3 mm.

The incident surface 81 is a surface formed along a longitudinal direction (the x-axis direction) of each of the LED light guide rods 8 at an opposite side to the emitting side of the reflecting portion 5. More specifically, the incident surface 81 is provided on a surface at the −z-axis direction side of the LED light guide rod 8. Similarly, the microstructure 83 is also provided on a surface at the −z-axis direction side of the LED light guide rod 8. Moreover, the reflecting surface 82 and the emitting surface 84 are provided on the surface at the +z-axis direction side of the LED light guide rod 8.

The LED light source 10 is disposed in the −z-axis direction from the LED light guide rod 8 on the back portion 51 of the reflecting portion 5. The LED light source 10 (more specifically, the light emitting portion of the LED light source 10) is disposed in a close position to the −z-axis direction of the incident surface 81 of the LED light guide rod 8. An LED light L100 incident from the incident surface 81 of the LED light guide rod 8 is propagated in the +z-axis direction and is divided into light propagated in the +x-axis direction and the −x-axis direction through the reflecting surface 82.

The LED light L100 is totally reflected on the interface between the LED light guide rod 8 and the air layer, and at the same time, is propagated in the +x-axis direction or the −x-axis direction. Any of light travelling in the +x-axis direction or the −x-axis direction which is incident on the microstructure 83 changes the travelling direction. Any of the LED light L100 having the travelling directions changed do not satisfy a total reflecting condition on the interface between the surface of the LED light guide rod 8 and the air layer. They are emitted from the emitting surface 84 of the LED light guide rod 8 in the +z-axis direction.

The incident surface 81 and the reflecting surface 82 in the LED light guide rod 8 have a structure for dividing the LED light L100 into light propagated in the +x-axis direction and the −x-axis direction in the LED light guide rod 8. Moreover, a shape, an arrangement position and an arrangement density of the microstructure 83 are determined in such a manner that the LED light L100 emitted from the emitting surface 84 is changed into linear light having uniform intensity distribution in the x-axis direction. For example, the shapes of the incident surface 81, the reflecting surface 82 and the microstructure 83 have a prism structure extended in the y-axis direction. The LED light L100 is converted into linear light (second linear light) extended in the x-axis direction by the LED light guide rod 8. The shapes of the incident surface 81, the reflecting surface 82 and the microstructure 83 are not restricted to the prism structure but may take such shapes as to perform the functions described above.

The LED light L100 emitted in the +z-axis direction from the emitting surface 84 of the LED light guide rod 8 is reflected in the −z-axis direction by the reflecting bar 6 as shown in FIG. 3. The LED light L100 travelling in the −z-axis direction reaches the back portion 51 of the reflecting portion 5 and is diffused and reflected by the back portion 51, and thus spreads in the y-axis direction. The LED light L100 spreads in the y-axis direction and thus spatially overlaps with the laser beam L90 emitted from the adjacent laser beam guide rod 7 in addition to the LED light L100 emitted from the adjacent LED light guide rod 8, and is emitted from the opening portion 56 and is changed into planar light for illuminating the back surface 1b of the liquid crystal panel 1.

As described above, the reflecting bar 6 serves to cause the laser beam L90 and the LED light L100 to spread in the y-axis direction. The laser beam L90 and the LED light L100 are changed into linear light extended in the x-axis direction by the laser beam guide rod 7 and the LED light guide rod 8. Furthermore, the reflecting bar 6 is disposed in front of the laser beam guide rod 7 close thereto, and the laser beam L90 and the LED light L100 are reflected by the same reflecting bar 6. The reflecting bar 6 is disposed close to the +z-axis side of the laser beam guide rod 7 and the LED light guide rod 8 is disposed close to the −z-axis side of the laser beam guide rod 7. By mixing the colors of the red laser beam L90 emitted from the laser beam guide rod 7 and the blue-green LED light L100 emitted from the LED light guide rod 8 before spreading at divergence angles possessed by the respective light sources, consequently, it is possible to obtain white light.

Moreover, the reflecting bar 6 is close to the laser beam guide rod 7 so that the width in the y-axis direction of the reflecting bar 6 can be minimized. The width in the y-axis direction of the reflecting bar 6 is designed in such a manner that the laser beam L90 and the LED light L100 have the same intensity distribution over the display surface 1a of the liquid crystal panel 1 based on a distance in the y-axis direction from the reflecting bar 6 to the laser beam source 9 or the LED light source 10 and a distance from the back portion 51 to the opening portion 56. It is desirable that the reflecting bar 6 should be a member having a high reflectance such as a light reflection sheet or a mirror.

Next, a control system of the liquid crystal display device 100 will be described with reference to FIG. 5. FIG. 5 is a block diagram showing the liquid crystal display device 100. By individually controlling a quantity of light emission of the LED light source 10 and a quantity of light emission of the laser beam source 9, it is possible to reduce power consumption. The liquid crystal panel driving unit 32 drives the liquid crystal panel 1. The LED light source driving unit 33a drives the LED light source 10. The laser beam source driving unit 33b drives the laser beam source 9. The control unit 31 controls the liquid crystal panel driving unit 32, the LED light source driving unit 33a, and the laser beam source driving unit 33b.

For example, the control unit 31 individually controls the LED light source driving unit 33a and the laser beam source driving unit 33b, thereby enabling regulation of a rate of a quantity of blue-green light emitted from the LED light source 10 and a quantity of red light emitted from the laser beam source 9. A rate of light intensities of necessary respective colors is varied in response to a video signal input to the control unit 31. By regulating a quantity of light emission from each light source corresponding to the video signal, it is possible to implement reduction in the power consumption.

The LED element and the laser beam emitting element are light sources having different characteristics from each other. In particular, both of them have divergence angles of emitted light (angle intensity distribution) which are greatly different from each other. Specifically, the LED light has a greater divergence angle than a laser beam. In other words, the laser beam has a smaller divergence angle and a higher straightness as compared with the LED light. For this reason, the laser beam L90 can be incident on the laser beam guide rod 7 with a small loss. In the present preferred embodiment, the laser beam sources 9 and the incident surfaces 71 and 72 of the laser beam guide rod 7 are disposed on the outside of the reflecting portion 5. However, the laser beam having the small divergence angle can be incident in the laser beam guide rod 7 with a small loss. Therefore, much light can be used for display.

Moreover, the LED element and the laser beam emitting element have different light emission efficiency for heat (temperature) from each other. In particular, the laser beam emitting element has an emission light quantity and a wavelength which are easily varied depending on the temperature. For this reason, in the case in which the LED element and the laser beam emitting element are similarly disposed side by side on the back surface side of the display surface as in a general directly under type liquid crystal display device, for example, heat generated by the LED element influences the light emission of the laser beam emitting element. Accordingly, it is desirable that a heat source should not be disposed close to the laser beam emitting element. In that respect, in the present preferred embodiment, the LED light source 10 is disposed on the inside of the back portion 51 of the reflecting portion 5 and the laser beam source 9 is disposed on the outside of the side portions 52 and 53 of the reflecting portion 5. Thus, the LED light source 10 and the laser beam source 9 are disposed apart from each other, resulting in a structure in which they are hardly mutually influenced by the heat.

Although the description has been given on the assumption that the laser beam guide rod 7 is a cylindrical member having a diameter of approximately 3 mm, moreover, the present invention is not restricted thereto. For example, it is also possible to use a prism-shaped member having a square end face. Furthermore, it is also possible to use a bar-shaped member having a rectangular or elliptical end face. In the case in which the end face takes a rectangular or elliptical shape, however, it is desirable that a long side of a rectangle or a major axis of an ellipse should be disposed in parallel with the fast axis direction of the laser beam emitting element.

In the reflecting portion 5, moreover, there is employed a structure in which the side portions 52, 53, 54 and 55 are tilted from a perpendicular direction to the back portion 51 which is parallel with the x-y plane. By such a structure, the laser beam L90 and the LED light L100 incident on the tilted side portions 52, 53, 54 and 55 are reflected in the +z-axis direction. Therefore, a peripheral part of the display surface 1a of the liquid crystal panel 1 can be bright. By thus tilting the side portions 52 and 53, furthermore, it is possible to dispose the laser beam source 9 on the back surface side (the −z-axis direction side) of the diffusing plate 4 as shown in FIG. 1. Consequently, a bezel can be narrowed. Herein, the disposition of the laser beam source 9 on the back surface side of the diffusing plate 4 implies that the laser beam source 9 is not protruded outward from the end face in the x-axis direction of the diffusing plate 4 or the laser beam source 9 is only partially protruded outward.

A-4. Modification Example

Figure 6:
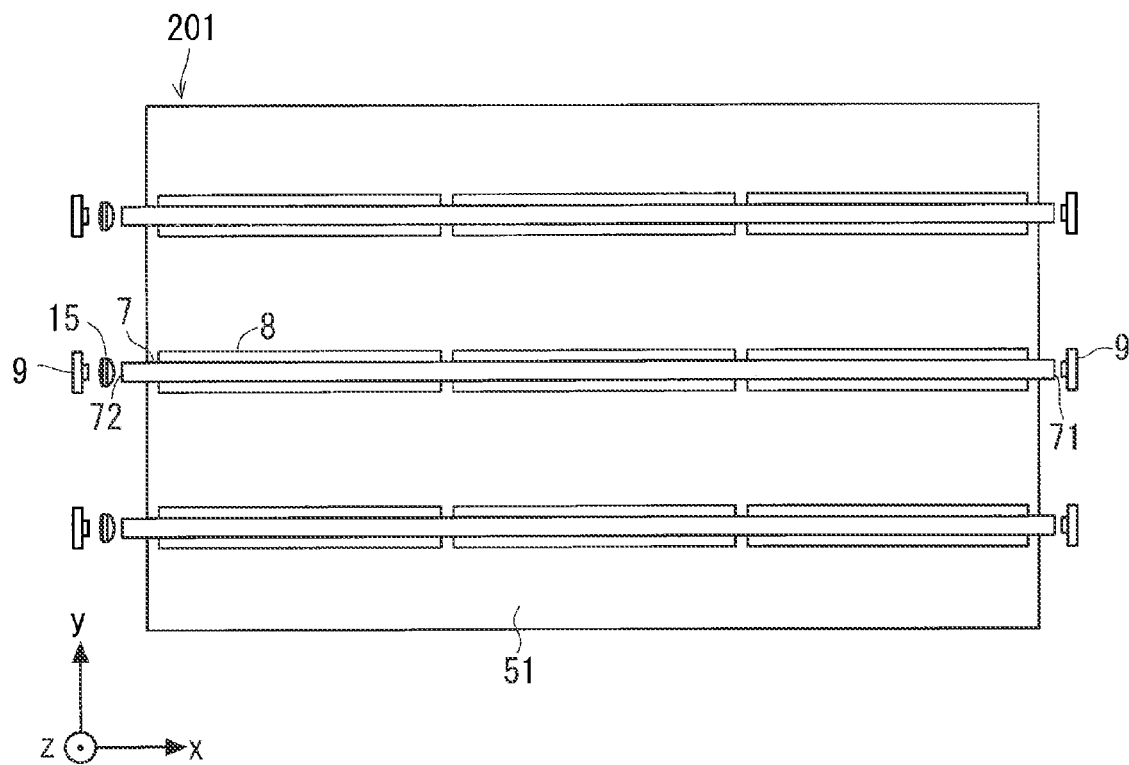
FIGS. 6 and 7 are views showing a structure of a surface light source device according to a modification example of the first preferred embodiment.

FIG. 6 is a view showing a structure of a surface light source device 201 according to a first modification example of the present preferred embodiment. In the surface light source device 200 shown in FIGS. 1 and 2, the lens 15 is disposed opposite to each of the incident surfaces 71 and 72 of the laser beam guide rod 7. In contrast, in the surface light source device 201, the lens 15 is disposed between the incident surface 72 of the laser beam guide rod 7 and the laser beam source 9, and is not disposed on an incident surface 71 side, and output light of the laser beam source 9 is directly incident on the incident surface 71. In this case, an interval between the incident surface 71 and the laser beam source 9 is fixed so as not to be varied depending on temperature and humidity, and they are thus disposed close to each other. On the other hand, the incident surface 72 side including the lens 15 has such a structure as to enable change in a length of the laser beam guide rod 7 depending on the temperature and the humidity. Consequently the number of the lenses 15 can be reduced by half to configure the surface light source device 200.

Figure 7:
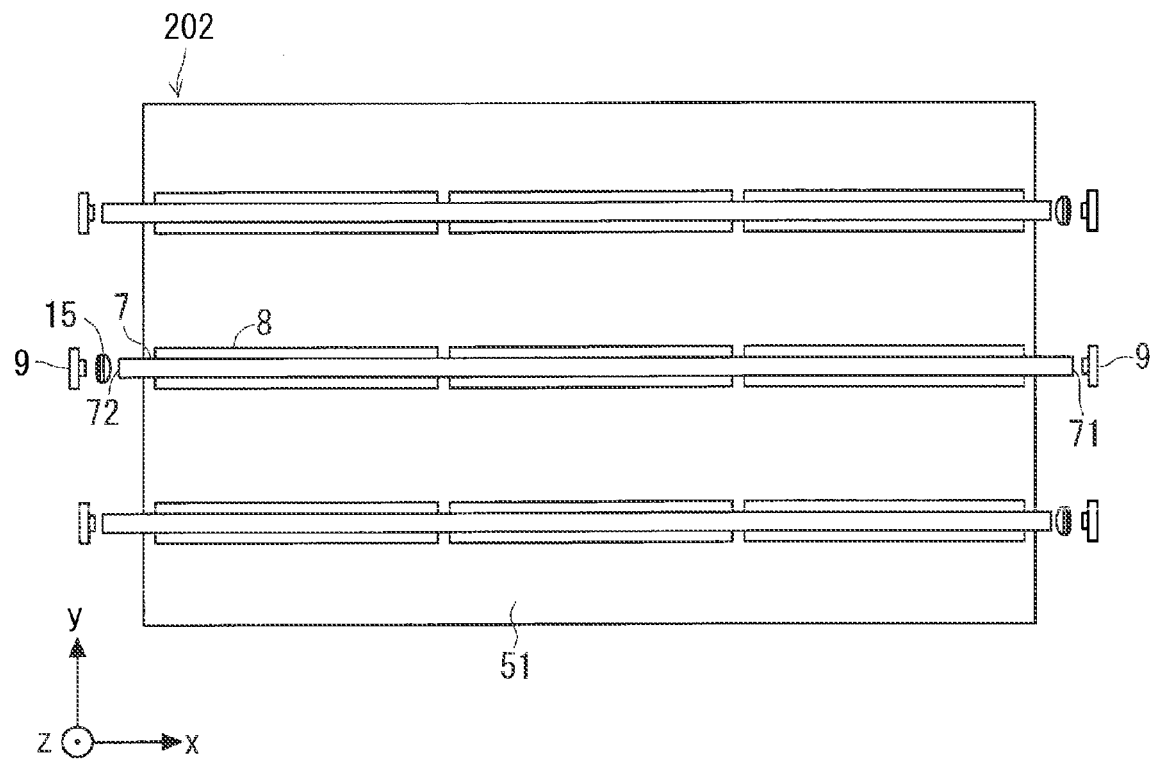

FIG. 7 is a view showing a structure of a surface light source device 202 according to a second modification example of the present preferred embodiment. If the lens 15 is provided on only the incident surface 72 as in the surface light source device 201, an intensity difference is made in the laser beam L90 incident from each of the incident surfaces 71 and 72 depending on a transmittance of the lens 15. In the surface light source device 202, therefore, the lens 15 is provided on only the incident surface 71 side for a certain laser beam guide rod 7, and the lens 15 is provided on only the incident surface 72 side with respect to the adjacent laser beam guide rod 7 to the laser beam guide rod 7. Thus, the lens 15 is disposed alternately on the incident surface 71 side and the incident surface 72 side along the y-axis direction. Consequently, uniform intensity distribution can be obtained in the whole plane of the surface light source device 202.

Figure 8:
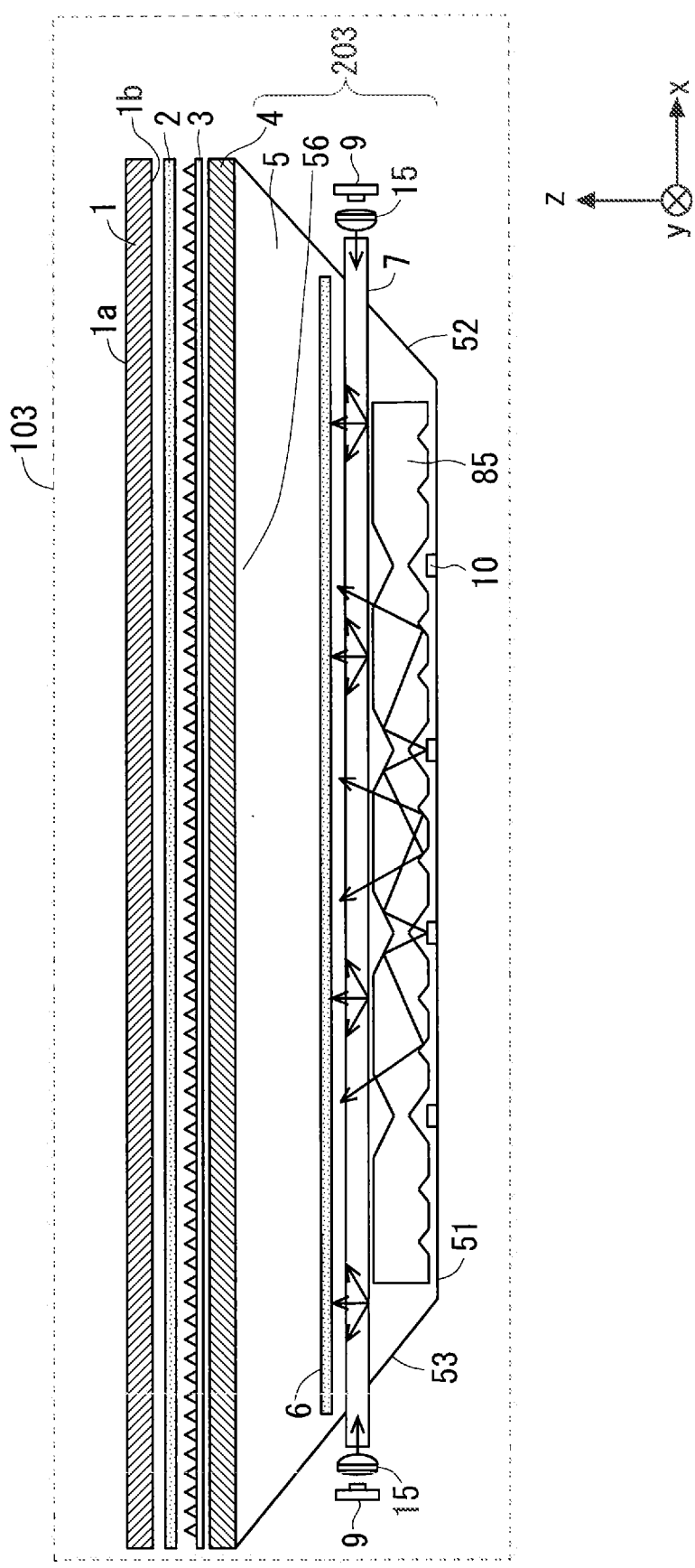
FIG. 8 is a view showing a structure of a liquid crystal display device according to the modification example of the first preferred embodiment.

FIG. 8 is a view showing structures of a surface light source device 203 according to a third modification example of the present preferred embodiment and a liquid crystal display device 103 including the same. In the surface light source device 200 shown in FIG. 1, three LED light guide rods 8 are disposed at a predetermined interval in the x-axis direction respectively with respect to the single laser beam guide rod 7, and one of the LED light guide rods 8 has the single incident surface 81. However, the surface light source device 203 includes an LED light guide rod 85 having a plurality of incident surfaces 81 in place of the LED light guide rod 8. The single LED light guide rod 85 is disposed in the x-axis direction with respect to the single laser beam guide rod 7.

In the present preferred embodiment, it has been described that a laser beam source 9 is configured from a laser beam emitting element for emitting red light and an LED light source 10 is configured from an LED element for emitting blue-green light. However, the present invention is not restricted thereto but the LED light source 10 may be configured from an LED element for emitting green light and the laser beam source 9 may be configured from a laser beam emitting element for emitting red light and a laser beam emitting element for emitting blue light. Moreover, the LED light source 10 may be configured from the LED element for emitting red light and the LED element for emitting green light, and the laser beam source 9 may be configured from the laser beam emitting element for emitting blue light.

In the case in which the laser beam source 9 is configured from the laser beam emitting element for emitting red light, it is possible to show a more remarkable difference from the conventional liquid crystal display device in reduction in power consumption and enhancement in color purity as compared with the case in which the laser beam emitting element for emitting blue light is used.

Although the laser beam source 9 and the LED light source 10 are used as the light sources having the different divergence angles from each other in the surface light source devices 201 to 203, moreover, the present invention can also be applied to the case in which a light source of a single type is used. For example, the LED light source 10 and the LED light guide rod 8 are eliminated from the structure of the surface light source device 201, and the laser beam emitting elements for the red, blue and green colors are used for the laser beam source 9. With this structure, similarly, the reflecting bar 6 is provided on the emitting side (+z-axis direction) close to the laser beam guide rod 7. Therefore, the linear light emitted from the laser beam guide rod 7 is reflected between the reflecting bar 6 and the reflecting surface of the reflecting portion 5 and thus spreads in the y-axis direction, and is mixed into the light emitted from the adjacent laser beam guide rod 7. Consequently, excellent in-plane uniformity of the emitted light can be obtained. Also in the case in which the laser beam source 9 and the laser beam guide rod 7 are eliminated from the structure of the surface light source device 201 and the LED light emitting elements for the red, blue and green colors are used for the LED light source 10, the same effects can be obtained.

A-5. Effect

The surface light source devices 200 to 203 for emitting planar light include the laser beam source 9 (a first light source) for emitting the laser beam L90 (first light), the laser beam guide rod 7 (a first light guide rod) having the incident surfaces 71 and 72, causing the first light to be incident from the incident surfaces 71 and 72 and converting the first light into first linear light, the LED light source 10 (a second light source) for emitting the LED light L100 (second light) having a greater divergence angle than the laser beam L90, and the LED light guide rod 8 (a second light guide rod) having the incident surface 81, causing the LED light L100 to be incident from the incident surface 81 and converting the LED light L100 into second linear light extended in the same direction as the first linear light. Moreover, the surface light source device 200 includes the reflecting bar 6 disposed on an emitting side of the planar light from the laser beam guide rod 7 and the LED light guide rod 8, and the reflecting portion 5 for accommodating the laser beam guide rod 7, the LED light source 10, the LED light guide rod 8 and the reflecting bar 6. The reflecting portion 5 takes such a box shape that an internal wall serves as a reflecting surface for reflecting the first and second linear light, and has the opening portion 56 on a surface at the emitting side of the planar light. By this structure, the first linear light and the second linear light are reflected by the reflecting bar 6 and the reflecting surface and are thus mixed with each other, and furthermore, are mixed with the linear light of the adjacent laser beam guide rod 7 and LED light guide rod 8. Therefore, uniform planar light having neither color irregularity nor luminance unevenness can be emitted from the opening portion 56 to the outside of the reflecting portion 5.

Moreover, the incident surface of the laser beam guide rod 7 (the first light guide rod) includes the incident surface 71 (the first incident surface) and the incident surface 72 (the second incident surface) to be the end faces in the longitudinal direction of the laser beam guide rod 7, and a pair of light sources is provided as the laser beam source 9 in opposed positions to the incident surfaces 71 and 72, respectively. Accordingly, there is enhanced luminance uniformity in a longitudinal direction of the first linear light in the laser beam guide rod 7.

Furthermore, the laser beam guide rod 7 has ends including the incident surfaces 71 and 72 which are protruded to the outside of the reflecting portion 5, the laser beam source 9 is disposed on the outside of the reflecting portion 5, and the LED light source 10 and the LED light guide rod 8 are disposed on the inside of the reflecting portion 5. By this arrangement, the laser beam source 9 and the LED light source 10 are separated from each other. Therefore, it is possible to avoid change in an output characteristic due to heat of the mutual light sources.

Moreover, the incident surface 81 of the LED light guide rod 8 is a third incident surface formed on an opposite side to the emitting side in the longitudinal direction of the LED light guide rod 8, and the LED light source 10 is disposed in an opposed position to the third incident surface. By disposing the LED light source 10, thus, the laser beam source 9 and the LED light source 10 are separated from each other. Therefore, it is possible to avoid change in an output characteristic due to heat of the mutual light sources.

Furthermore, the surface light source devices 200 to 203 include a lens 15 for collecting the laser beam L90. The lens 15 is disposed either between the incident surface 71 and the laser beam source 9 opposed thereto or between the incident surface 72 and the laser beam source 9 opposed thereto. Even if the first light guide rod expands/contracts depending on temperature or humidity so that the interval between the incident surface and the first light source is changed, consequently, the first light is changed into parallel light by the lens 15 so that the laser beam L90 can be incident on the first light guide rod without leakage. Thus, reduction in light efficiency can be avoided, and furthermore, stable intensity distribution can be obtained.

Moreover, the laser beam guide rod 7 is disposed on the opening portion 56 side from the LED light guide rod 8. In the surface light source devices 200 to 203, the LED light source 10 is disposed on the back portion 51 of a housing as a directly under type arrangement. Therefore, the LED light guide rod 8 is disposed on the back portion 51 side from the laser beam guide rod 7 (the opposite side to the opening portion 56). Consequently, it is possible to prevent the LED light from being diffused by the influence of the laser beam guide rod 7 before propagation to the LED light guide rod 8. By causing the distances of the LED light source 10 and the LED light guide rod 8 to be close to each other, furthermore, a ray can be propagated efficiently into the LED light guide rod 8. Consequently, it is easy to control the ray. For this reason, color irregularity or luminance unevenness can be relieved more readily.

In addition, the laser beam guide rod 7 is constituted by using a transparent material and a diffusing material having a higher refractive index than the transparent material. Therefore, the laser beam L90 incident on the laser beam guide rod 7 is diffused and reflected by the diffusing material and thus spreads in the longitudinal direction of the laser beam guide rod 7, and is thus converted into the linear light. Then, the laser beam L90 is reflected by the reflecting bar 6 and the reflecting surface of the reflecting portion 5, and is thus mixed with the laser beam L90 emitted from the adjacent laser beam guide rod 7 so that uniform planar light can be obtained.

Moreover, the laser beam source 9 is used as the first light source in the surface light source devices 200 to 203. The laser beam has a smaller divergence angle and a higher straightness as compared with the LED light. Also in the case in which the end face in the longitudinal direction of the laser beam guide rod 7 is set to be the incident surface of the laser beam, therefore, the laser beam can be incident on the laser beam guide rod 7 with a small loss. In addition, the laser beam source has a narrower wavelength bandwidth and can obtain light having higher color purity than those in the white LED light source. Therefore, a wide color reproducing range can be acquired. It is possible to reduce a loss of a light quantity through a color filter and to enhance utilization efficiency of the light. For example, in the case in which the laser beam source 9 configured from a red laser beam emitting element is used, the color purity of the red color can be enhanced and the light quantity of the red color transmitted through the green filter can be reduced. Therefore, the color purity of the green color can also be enhanced.

In the surface light source devices 200 to 203, furthermore, the LED light source 10 is used as the second light source. For example, in the case in which the laser beam source 9 configured from the red laser beam emitting element is used as the first light source, the LED light source 10 configured from the blue-green LED element is used as the second light source so that white light can be obtained by overlap of the first and second linear light. In the case in which the blue-green LED light source is employed, particularly, it is possible to obtain smaller power consumption and higher power than those in a single LED light source for emitting green light or a laser beam source for emitting green light.

In addition, the present invention can also be applied to a surface light source device using a light source of a single type. The surface light source device emits planar light, and includes a light source, a light guide rod for receiving light from the light source and converting the light into linear light, a reflecting bar 6 disposed on an emitting side of the planar light from the light guide rod, and a reflecting portion taking such a box shape as to accommodate the light source, the light guide rod and the reflecting bar 6 and to have an internal wall serving as a reflecting surface for reflecting the linear light, and having an opening portion 56 on a surface at the emitting side of the planar light. The linear light is reflected by the reflecting bar 6 and the reflecting surface and is emitted from the opening portion 56 to the outside of the reflecting portion. With such a structure, the linear light emitted from the light guide rod is reflected between the reflecting bar 6 and the reflecting surface of the reflecting portion 5 and spreads, and is thus mixed with light emitted from the adjacent light guide rod. Accordingly, it is possible to obtain emitted light having excellent in-plane uniformity.

Moreover, the liquid crystal display device according to the present preferred embodiment includes the surface light source devices 200 to 203, and the liquid crystal panel 1 for displaying an image through illumination with light from the surface light source devices 200 to 203. Accordingly, it is possible to carry out display without color irregularity and luminance unevenness.

While the invention has been shown and described in detail, the foregoing description is in all aspects illustrative and not restrictive. It is therefore understood that numerous modifications and variations can be devised without departing from the scope of the invention.

What is claimed is:

1. A surface light source device for emitting planar light, comprising:
   a first light source for emitting first light;
   a first light guide rod having an incident surface, causing said first light to be incident from the incident surface and converting said first light into first linear light;
   a second light source for emitting second light having a greater divergence angle than said first light;
   a second light guide rod having an incident surface, causing said second light to be incident from the incident surface and converting said second light into second linear light extended in the same direction as said first linear light;
   a reflecting bar disposed on an emitting side of said planar light from said first light guide rod and said second light guide rod; and
   a reflecting portion taking such a box shape as to accommodate said first light guide rod, said second light source, said light guide rod and said reflecting bar and to have an internal wall serving as a reflecting surface for reflecting said first linear light and said second linear light, and having an opening portion on a surface at the emitting side of said planar light, wherein said first linear light and said second linear light are reflected by said reflecting bar and said reflecting surface and are emitted from said opening portion to an outside of said reflecting portion.

2. The surface light source device according to claim 1, wherein the incident surface of said first light guide rod includes a first incident surface and a second incident surface which are end faces in a longitudinal direction of said first light guide rod, and a pair of light sources is provided as said first light source in opposed positions to said first incident surface and said second incident surface.

3. The surface light source device according to claim 2, wherein said first light guide rod has ends including said first incident surface and said second incident surface protruded to the outside of said reflecting portion, said first light source is disposed on the outside of said reflecting portion, and said second light source and said second light guide rod are disposed on the inside of said reflecting portion.

4. The surface light source device according to claim 2, wherein the incident surface of said second light guide rod is a third incident surface formed on an opposite side to said emitting side in a longitudinal direction of said light guide rod, and said second light source is disposed in an opposed position to said third incident surface.

5. The surface light source device according to claim 2 further comprising a lens for collecting said first light, said lens being disposed either between said first incident surface and said first light source opposed thereto or between said second incident surface and said first light source opposed thereto.

6. The surface light source device according to claim 4, wherein said first light guide rod is disposed on said opening portion side from said second light guide rod.

7. The surface light source device according to claim 1, wherein said first light guide rod is constituted by using a transparent material and a diffusing material having a higher refractive index than said transparent material, and diffuses, reflects and emits said first light which is incident.

8. The surface light source device according to claim 1, wherein said first light source is a laser beam source.

9. The surface light source device according to claim 1, wherein said second light source is an LED light source.

10. A surface light source device for emitting planar light, comprising:

a light source;

a light guide rod for receiving light from said light source and converting said light into linear light;

a reflecting bar disposed on an emitting side of said planar light from said light guide rod; and a reflecting portion taking such a box shape as to accommodate said light source, said light guide rod and said reflecting bar and to have an internal wall serving as a reflecting surface for reflecting said linear light, and having an opening portion on a surface at the emitting side of said planar light, wherein said linear light is reflected by said reflecting bar and said reflecting surface and is emitted from said opening portion to an outside of said reflecting portion.

11. A liquid crystal display device comprising:

the surface light source device according to claim 1, and a liquid crystal panel for displaying an image through illumination with light from said surface light source device.

* * * * *